Patented June 15, 1926.

1,588,814

UNITED STATES PATENT OFFICE.

WERNER SCHULEMANN, OF VOHWINKEL, NEAR ELBERFELD, AND FRITZ SCHÖN-HÖFER, OF ELBERFELD, GERMANY, ASSIGNORS TO WINTHROP CHEMICAL COMPANY, INC., OF NEW YORK, N. Y.

ANTIPYRETIC.

No Drawing. Application filed November 21, 1925, Serial No. 70,674, and in Germany April 4, 1924.

The present invention relates to the manufacture and production of the hitherto unknown ortho-acetoxy-para-methoxybenzoic acid having most probably the formula:

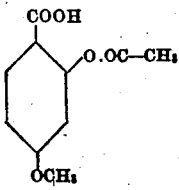

It crystallizes from alcohol in the shape of needles melting at 119–121° C. and has proved to be a valuable antipyretic, an average single dose being from ½ to 1 gram. It forms soluble salts with alkali metals which retain the valuable property of the free acid.

The process of producing our new product consists in cautiously acetylating the para-methoxy-ortho-hydroxy-benzoic acid. By this process the formation of other similar products (Berichte 24, 2852; Journal of the Chemical Society 107, 1494) of other melting points which do not possess the valuable therapeutic properties of our new compound is avoided.

In order to illustrate our new process more fully the following example is given:

168 parts by weight of para-methoxy-ortho-hydroxy-benzoic acid are dissolved in 300 parts by weight of ether (free from water) and this solution is boiled for 1–1½ days together with 115 parts by weight of acetic acid anhydride. The ether is distilled off. The remaining oil soon solidifies to a crystalline cake. It crystallizes from alcohol in the shape of needles melting at from 119–121° C.

The sodium salt can be obtained by treating the solution of the acid in acetone and water with sodium carbonate and precipitating the salt with ether. It is soluble in water. With ferric chloride a yellowish-brown precipitate results melting at 258–260° C.

This application is a continuation in part of our application Serial No. 20,544, filed April 3, 1925.

We claim:

1. Process for producing ortho-acetoxy-para-methoxy-benzoic acid which comprises heating para-methoxy-ortho-hydroxy-benzoic acid with acetic anhydride.

2. The hereindescribed new ortho-acetoxy-para-methoxy-benzoic acid having most probably the formula:

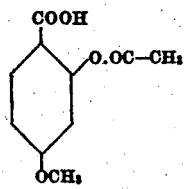

crystallizing from alcohol in the shape of needles melting at from 119–121° C., being a valuable antipyretic, an average single dose being from 0.5–1 gram and forming salts with alkali metals which retain the valuable therapeutic properties of the free acid, substantially as described.

In testimony whereof, we affix our signatures.

WERNER SCHULEMANN.
FRITZ SCHÖNHÖFER.